US008200067B2

(12) United States Patent
Rockwell

(10) Patent No.: US 8,200,067 B2
(45) Date of Patent: Jun. 12, 2012

(54) PROCESSING OF SCALABLE COMPRESSED VIDEO DATA FORMATS FOR NONLINEAR VIDEO EDITING SYSTEMS

(75) Inventor: Michael Rockwell, Palo Alto, CA (US)

(73) Assignee: Avid Technology, Inc., Burlington, MA (US)

( * ) Notice: Subject to any disclaimer, the term of this patent is extended or adjusted under 35 U.S.C. 154(b) by 1444 days.

(21) Appl. No.: 11/728,767

(22) Filed: Mar. 27, 2007

(65) Prior Publication Data

US 2007/0230895 A1  Oct. 4, 2007

Related U.S. Application Data

(60) Provisional application No. 60/786,475, filed on Mar. 28, 2006.

(51) Int. Cl.
*G11B 27/00* (2006.01)
(52) U.S. Cl. ........................................ 386/278; 386/284
(58) Field of Classification Search .................. None
See application file for complete search history.

(56) References Cited

U.S. PATENT DOCUMENTS

| 2005/0058430 A1* | 3/2005 | Nakamura et al. ............. 386/52 |
| 2006/0071920 A1* | 4/2006 | Ishimatsu et al. ............. 345/204 |
| 2006/0072838 A1* | 4/2006 | Chui et al. .................... 382/232 |

* cited by examiner

*Primary Examiner* — William C Vaughn, Jr.
*Assistant Examiner* — Asher Khan
(74) *Attorney, Agent, or Firm* — Oliver Strimpel

(57) ABSTRACT

If motion video data is stored in a scalable format, such as motion JPEG 2000, in computer files on disk drives, then access to only the lower bandwidth data requires skipping around within a data file to locate only the desired data for a specified progression dimension for each image. This skipping around causes seek and rotational latency to occur for each image, and increases access time per image and lowering the available bandwidth for reading motion video from the storage system. Such increases in access time significantly degrade performance of local and shared storage systems, particularly for video editing and other video playback systems used in production, post-production and broadcast operations. To improve the performance of such systems, motion video data stored in a scalable format is processed so as to copy the lower bandwidth data into a separate file. These separate files can be accessed by video editing systems, media management systems and other devices or computer programs that use the lower bandwidth data.

7 Claims, 2 Drawing Sheets

PROCESSING OF SCALABLE COMPRESSED VIDEO DATA FORMATS FOR NONLINEAR VIDEO EDITING SYSTEMS

CROSS-REFERENCE TO RELATED APPLICATION

This application claims right of priority to and the benefit, under 35 USC §119(e), of prior filed provisional application Ser. No. 60/786,475, filed on Mar. 28, 2006, which is incorporated herein by reference.

BACKGROUND

Scalable image compression techniques, typically based on wavelet processing, generally format compressed image data such that the compressed data required to generate decompressed images of different resolutions or qualities can be readily extracted from the rest of the compressed data.

An example of this type of compression is the JPEG-2000 compressed still image format, as specified in ISO/IEC IS 15444-1. In JPEG 2000, scalability is provided by encoding the compressed data in code blocks that are ordered according to a progression. The four dimensions of a progression are resolution, quality, spatial location and component. Encoded data is ordered in the compressed bitstream according to the specified progression. Thus, generally speaking, if the progression is resolution, quality, spatial location and component, then all of the data required to produce the lowest resolution image is collected in one part of the bitstream, whereas other data required to produce the next higher resolution image is in the next part of the bitstream. The highest resolution image is produced by decompressing the entire compressed bitstream for the image. As a result, different kinds of scalability can be provided, the most common of which are quality, resolution and spatial scalability. For this application, the data that provides lower quality, or lower resolution, or a spatial or component subset of an image is referred to as the "lower bandwidth" data of the image.

Another part of the JPEG-2000 standard has been defined to apply to motion video ISO/IEC IS 15444-3. In this format, motion video, which is comprised of a sequence of still images, is compressed by compressing each still image in accordance with the JPEG 2000 still image compression standard. The compressed still images are collected into a file.

Because of the scalability provided by this compression format, it is possible to access a low resolution or low quality version of an image without reading the whole image file. For motion video, a video player or transmitter can simply drop data that will not be used.

SUMMARY

If motion video data is stored in a scalable format, such as motion JPEG 2000, in computer files on disk drives, then access to only the lower bandwidth data requires skipping around within a data file to locate only the desired data for a specified progression dimension for each image. This skipping around causes seek and rotational latency to occur for each image, and increases access time per image and lowering the available bandwidth for reading motion video from the storage system. Such increases in access time significantly degrade performance of local and shared storage systems, particularly for video editing and other video playback systems used in production, post-production and broadcast operations.

To improve the performance of such systems, motion video data stored in a scalable format is processed so as to copy the lower bandwidth data into a separate file. These separate files can be accessed by video editing systems, media management systems and other devices or computer programs that use the lower bandwidth data as a proxy for the compressed data.

DETAILED DESCRIPTION

Figure 1:
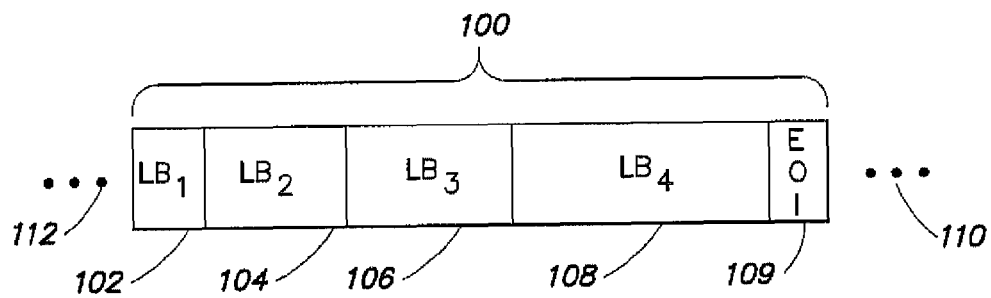
FIG. 1 is a diagram illustrating how compressed motion video data may be stored in a scalable compressed image format.

Referring now to FIG. 1, an example data file for scalable compressed video data, such as the motion JPEG 2000 file format, is shown. Compressed data is stored for a plurality of images, as indicated at 112, 100 and 110. Using image data 100 as an example, the lower bandwidth data LB1 is grouped together at the beginning of the bitstream for this image, as indicated at 102. The next higher bandwidth data LB2 follows at 104. If available, the next higher bandwidth data LB3 follows at 106. Finally, the data (LB4) required to decompress the full bandwidth image appears in the bitstream at 108. The bitstream may include a marker 109 that may indicate the end of the image.

An example of this type of compression is the JPEG-2000 compressed still image format, as specified in ISO/IEC IS 15444-1. In JPEG 2000, scalability is provided by encoding the compressed data in code blocks that are ordered according to a progression. The four dimensions of a progression are resolution, quality, spatial location and component. Encoded data is ordered in the compressed bitstream according to the specified progression. Thus, generally speaking, if the progression is resolution, quality, spatial location and component, then all of the data required to produce the lowest resolution image is collected in one part of the bitstream, whereas other data required to produce the next higher resolution image is in the next part of the bitstream. The highest resolution image is produced by decompressing the entire compressed bitstream for the image.

If motion video data is stored in a scalable format, such as motion JPEG 2000, in computer files on disk drives, then access to only the lower bandwidth data requires skipping around within a data file to locate only the desired data for a specified progression dimension for each image. This skipping around causes seek and rotational latency to occur for each image, and increases access time per image and lowering the available bandwidth for reading motion video from the storage system. Such increases in access time significantly degrade performance of local and shared storage systems, particularly for video editing and other video playback systems used in production, post-production and broadcast operations.

To improve the performance of such systems, motion video data stored in a scalable format is processed so as to copy the lower bandwidth data into a separate file. These separate files can be accessed by video editing systems, media management systems and other devices or computer programs that use the lower bandwidth data.

Figure 2:
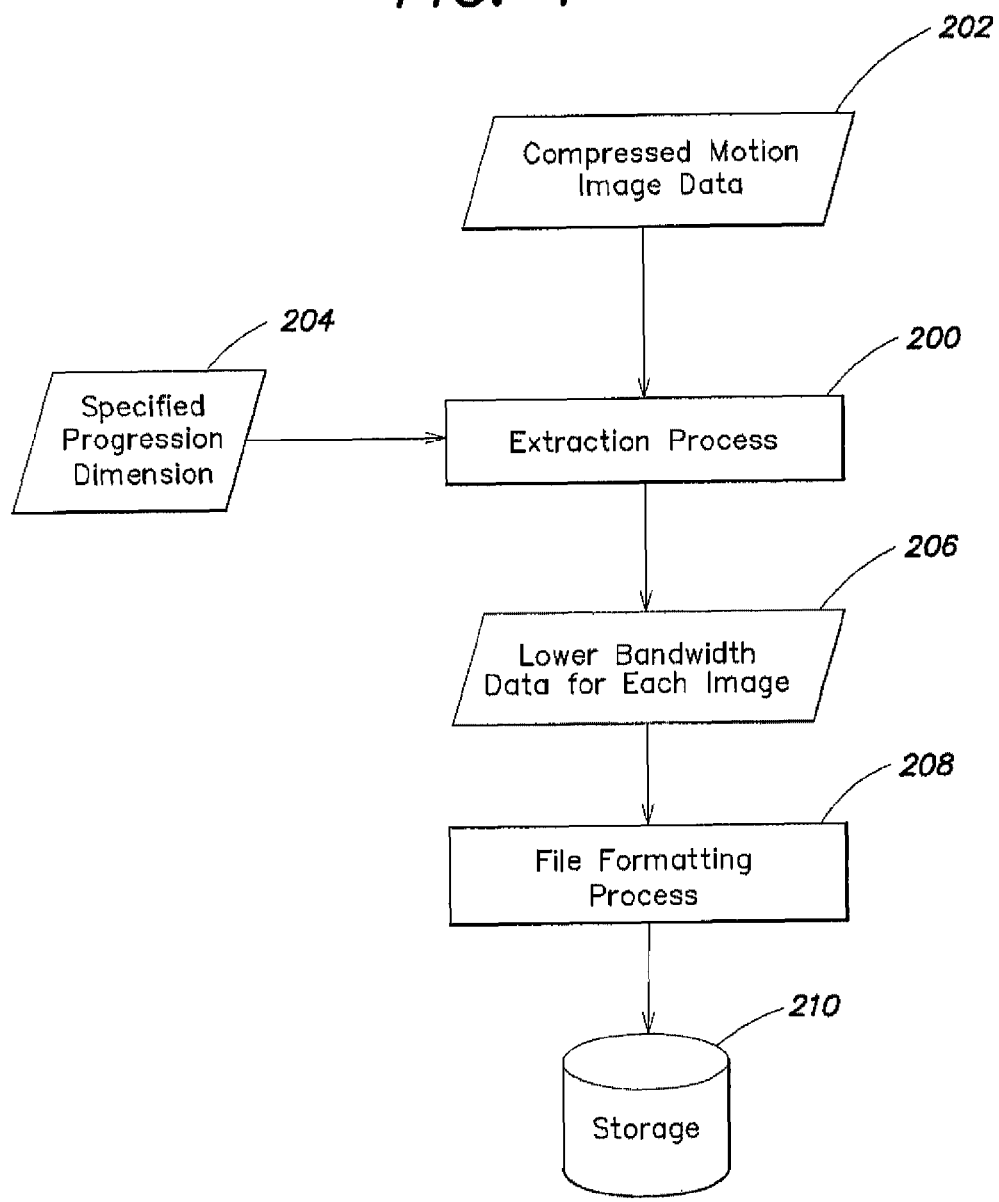
FIG. 2 is a data flow diagram describing how lower bandwidth data files may be generated from compressed image data in a format such as shown in FIG. 1.

Referring now to FIG. 2 a data flow diagram describes how lower bandwidth data files may be generated from compressed image data in a format such as shown in FIG. 1. The extraction process 200 receives, on the one hand, the compressed motion image data 202 and a specified progression dimension 204. The extraction process involves reading, for each image in the motion image data, the lower bandwidth data 206 as specified by the specified progression dimension. If the compressed motion image data is stored using a progression such that it is primarily ordered by the specified progression dimension, then the lower bandwidth data is readily extracted as it is the first block of data in the bitstream for each image.

In some cases, the compressed image data 202 may be stored using a progression that is not primarily ordered by the specified progression dimension. For example, the progression might specify that the compressed image data is ordered primarily by quality, but the specified progression dimension may be resolution. In this case, the extraction process would temporarily reorder the compressed image data for each image according to a new progression that is primarily ordered by the specified progression dimension, and then extract only the desired lower bandwidth data 206.

Given the extracted lower bandwidth data 206 for each image, the data for the images can be combined and formatted into a desired file format, such as a Material eXchange Format (MXF) file or an Advanced Authoring Format (AAF) file, by the file formatting process 208. The file formatting process 208 may generate an image index of the lower bandwidth data if desired. The file formatting process 208 then can store the file containing the extracted lower bandwidth data on storage 210. Due to the nature of the Motion JPEG2000 format, the reconstructed compressed bitstream that contains only the extracted lower bandwidth data can be processed directly by a Motion JPEG2000 decompression engine.

As noted above, the separate file with the lower bandwidth data is particularly useful for video editing and other video playback systems used in production, post-production and broadcast operations. Such systems may use either local or shared storage systems, or both, to store data. Access may be provided to the lower bandwidth data, the full bandwidth data or both. These separate lower bandwidth files can be used during editing in a video editing system, for browsing material in a media management system or for previewing the effects of other operations by yet other video processing devices. Higher bandwidth data could be used, for example, when a final product is being generated or for reviewing projects that are near completion.

Figure 3:
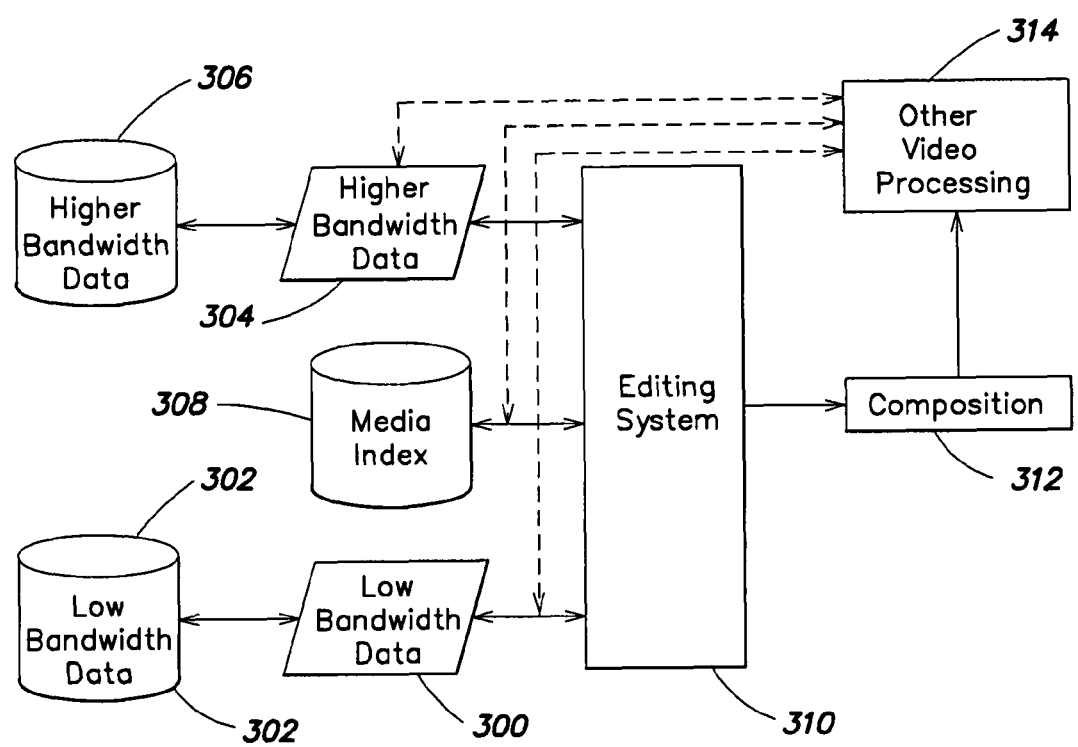
FIG. 3 is a diagram of an example system in which a video processing system accesses lower bandwidth video data from one data file and higher bandwidth video data from a related data file.

Referring now to FIG. 3, an example system in which a video processing system accesses lower bandwidth video data from one data file and higher bandwidth video data from a related data file. In particular, the lower bandwidth data 300 may be stored in storage partition 302. The higher bandwidth data 304 may be stored in storage partition 306. Storage partitions 302 and 306 may be on the same storage device or separate storage devices. They may be part of a larger shared storage system or may be in local storage. It is often desireable, regardless of the implementation of the storage system, to store the higher bandwidth data 304 in one partition that is separate from the storage partition for the lower bandwidth data 300. However, the invention is not so limited and the storage partitions 302 and 306 may be the same partition of a storage system.

A media index 308 tracks the path and file name under which the higher bandwidth data and the lower bandwidth data are stored, and associates each of them with a unique identifier for the media, which may be a globally unique identifier (GUID) or a name. Thus, the media index associates the higher bandwidth data with the lower bandwidth data.

The higher bandwidth data and the lower bandwidth data may be made available to one or more editing systems 310. An editing system may be set to have access to the high bandwidth data or the low bandwidth data or both. Such an editing system typically uses the lower bandwidth data as a proxy for the high bandwidth data. The editing system uses the media index to identify a file name for the file containing the desired data. Using the editing system, a user can create a video program. The sequence of clips created by the user are represented by a composition 312. Such a composition can be output to and used by one or more other video processing systems 314 which may use the higher bandwidth data, lower bandwidth data or both, and may access the media index 308.

With this system, the performance of the editing system(s) 310 and video processing system(s) 314 while using the lower resolution material is improved by reducing the impact on the storage subsystems to retrieve this data.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIGS. 2 and 3 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for enabling a user to edit a video program comprising a sequence of images, the system comprising:
    storage for storing compressed motion video data wherein a compressed bitstream includes, for each image of the sequence of images, compressed data grouped according to image data bandwidth and wherein the groups of compressed image data are ordered in a bitstream according to a progression of image data bandwidth that increases monotonically from lower bandwidth image data to higher bandwidth image data as defined by a specified one of a plurality of dimensions;
    a processor for copying a portion of the compressed bitstream corresponding to lower bandwidth image data as defined by the specified dimension into a file for storing lower bandwidth compressed video data; and
    a video editor having an interface for permitting a user to specify one or more clips wherein each clip references a range of video data in the file for storing lower bandwidth compressed video data and in the stored compressed motion video data, and for playing back the one or more clips using one of the file for storing lower bandwidth compressed video data or the stored compressed motion video data.

2. A method for creating a lower bandwidth proxy of compressed motion video data, wherein the compressed motion video data encodes a sequence of images, the method comprising:
    receiving compressed motion video data wherein a compressed bitstream includes, for each image, compressed data grouped according to image data bandwidth and wherein the groups of compressed image data are ordered in a bitstream according to a progression of image data bandwidth that increases monotonically from lower bandwidth image data to higher bandwidth image data as defined by a specified one of a plurality of dimensions;
    receiving an indication of the specified one of the plurality of dimensions;
    copying a portion of the compressed video data corresponding to a lower bandwidth representation of the compressed motion video data according to the specified one of the plurality of dimensions into a file for storing lower bandwidth compressed video data; and
    storing the file for storing lower bandwidth compressed video data on computer-readable storage.

3. A computer program product, comprising:
    a non-transitory computer readable medium and instructions stored on the computer readable medium that, when processed by a computer, instruct the computer to perform a method for creating a lower bandwidth proxy of compressed motion video data, wherein the video comprises a sequence of images, the method comprising:
    receiving compressed motion video data wherein a compressed bitstream includes, for each image, compressed data grouped according to image data bandwidth and wherein the groups of compressed image data are ordered in a bitstream according to a progression of image data bandwidth that increases monotonically from lower bandwidth image data to higher bandwidth image data as defined by one of a plurality of dimensions;
    receiving an indication of a specified one of the plurality of dimensions; and
    copying compressed video data corresponding to a lower bandwidth representation of the compressed motion video data according to the specified one of the plurality of dimensions into a file for storing lower bandwidth compressed video data.

4. The method of claim 2, wherein the specified one of the plurality of dimensions is image resolution.

5. The method of claim 2, wherein the specified one of the plurality of dimensions is image quality.

6. The method of claim 2, wherein the specified one of the plurality of dimensions is spatial location.

7. The method of claim 2, wherein the specified one of the plurality of dimensions is image component.

* * * * *